(12) United States Patent
Kordas et al.

(10) Patent No.: US 8,232,223 B2
(45) Date of Patent: Jul. 31, 2012

(54) SEPARATION OF N,N,N'-TRIMETHYLBISAMINO-ETHYLETHER FROM MIXTURES COMPRISING TERTIARY AMINES OR TERTIARY AMINOALKYLETHERS

(75) Inventors: Imre Kordas, Veszprem (HU); Heiko H. Humbert, Hamburg (DE); Gabor Felber, Veszprem (HU); Attila Gaspar, Petfurdo (HU); Robert A. Grigsby, Jr., Spring, TX (US); Petra E. Vanderstraeten, Leuven (BE)

(73) Assignees: Huntsman International LLC, The Woodlands, TX (US); Huntsman Corporation Hungary ZRT (HU)

( * ) Notice: Subject to any disclaimer, the term of this patent is extended or adjusted under 35 U.S.C. 154(b) by 215 days.

(21) Appl. No.: 12/598,072

(22) PCT Filed: May 1, 2008

(86) PCT No.: PCT/US2008/062239
§ 371 (c)(1),
(2), (4) Date: Feb. 11, 2010

(87) PCT Pub. No.: WO2008/140957
PCT Pub. Date: Nov. 20, 2008

(65) Prior Publication Data
US 2010/0144517 A1    Jun. 10, 2010

Related U.S. Application Data

(60) Provisional application No. 60/928,232, filed on May 8, 2007.

(51) Int. Cl.
*B01J 31/18* (2006.01)
*C07C 209/00* (2006.01)

(52) U.S. Cl. ........................................ 502/167; 564/470
(58) Field of Classification Search ................ None
See application file for complete search history.

(56) References Cited

U.S. PATENT DOCUMENTS

| | | | |
|---|---|---|---|
| 2,683,730 A | 7/1954 | Seeger et al. |
| 2,950,263 A | 8/1960 | Abbotson et al. |
| 3,012,008 A | 12/1961 | Lister |
| 3,194,773 A | 7/1965 | Hostettler |
| 3,297,597 A | 1/1967 | Edwards et al. |
| 3,330,782 A | 7/1967 | Poppelsdorf |
| 3,344,162 A | 9/1967 | Rowton |
| 3,362,979 A | 1/1968 | Bentley |
| 4,101,470 A | 7/1978 | McEntire |
| 4,338,408 A | 7/1982 | Zimmerman et al. |
| 4,433,170 A | 2/1984 | Zimmerman et al. |
| 4,767,736 A | 8/1988 | Petrella et al. |
| 5,756,558 A | 5/1998 | Savoca et al. |
| 5,824,711 A | 10/1998 | Kimock et al. |
| 5,874,483 A | 2/1999 | Savoca et al. |
| 6,051,527 A | 4/2000 | Savoca et al. |
| 7,009,081 B2 | 3/2006 | Mitchell et al. |
| 2006/0039860 A1 | 2/2006 | Monahan et al. |
| 2006/0155096 A1 | 7/2006 | Matsumoto et al. |
| 2008/0015273 A1 | 1/2008 | Burdeniuc et al. |

FOREIGN PATENT DOCUMENTS

JP    59134754    *    8/1984

* cited by examiner

*Primary Examiner* — Melvin C Mayes
*Assistant Examiner* — Yun Qian
(74) *Attorney, Agent, or Firm* — Monique M. Raub

(57) ABSTRACT

The present invention relates to a method for recovering N,N,N'-trimethylbisaminoethylether from a mixture with its amide and a method for separating N,N,N'-trimethylbisaminoethylether from mixtures comprising tertiary amines or tertiary aminoalkylether as well as a composition comprising a mixture of N,N,N'-trimethylbisaminoethylether and a transamidation agent.

26 Claims, No Drawings

SEPARATION OF N,N,N'-TRIMETHYLBISAMINO-ETHYLETHER FROM MIXTURES COMPRISING TERTIARY AMINES OR TERTIARY AMINOALKYLETHERS

CROSS-REFERENCE TO RELATED APPLICATIONS

This application is the National Phase of International Application PCT/US2008/062239 filed May 1, 2008 which designated the U.S. and which claims priority to U.S. Provisional App. Ser. No. 60/928,232 filed May 8, 2007. The noted applications are incorporated herein by reference.

FIELD OF THE INVENTION

The present invention relates to a method for recovering N,N,N'-trimethylbisaminoethylether from a mixture with its amide and a method for separating N,N,N'-trimethylbisaminoethylether from mixtures comprising tertiary amines or tertiary aminoalkylether as well as a composition comprising a mixture of N,N,N'-trimethylbisaminoethylether and a transamidation agent.

BACKGROUND OF THE INVENTION

N,N,N'-trimethylbisaminoethylether (T3MBAEE) is an important chemical compound and can be used as a precursor for the manufacturing of catalysts. In general N,N,N'-trimethylbisaminoethylether is present as a side product in the manufacturing process for N,N,N',N'-tetramethylbisaminoethylether which is a catalyst used in the production of polyurethane foam. Blends of N,N,N',N'-tetramethylbisaminoethylether and N,N,N'-trimethylbisaminoethylether are formed when methylamines comprising a mixture of monomethylamine, dimethylamine and trimethylamine are reacted with diethylene glycole over a copper chromite catalyst. The ratio of these materials may vary by a wide range depending on the composition of methylamines (ratio of dimethylamine versus monomethylamine). Due to the fact, that N,N,N',N'-tetramethylbisaminoethylether and N,N,N'-trimethylbisaminoethylether have boiling points which differ from each other only slightly any distillative purification is extremely difficult.

However, for quality reasons it is important to provide customers with highly purified N,N,N',N'-tetramethylbisaminoethylether and likewise there is a high economic interest to recover the T3MBAEE because it might be used itself as a starting material for other high valuable chemical components. Derivatisation of T3MBAEE is technically difficult and/or uneconomic because no pure T3MBAEE is available for synthetic purposes. The prior art only provides blends which cause technical problems if recycling of N,N,N'-trimethylbisaminoethylether is required. This is because the separation by distillation will yield a blend of the same materials, however, having a different composition.

U.S. Pat. No. 5,874,483 discloses a method for the preparation of N,N,N'-trimethylbisaminoethylether by reacting dimethylaminoethoxyethanol with monomethylamine in the presence of a Cu/ZnO/Al$_2$O$_3$ catalyst. After distillation of the reaction product a mixture comprising 57.2 weight % N,N,N'-trimethylbisaminoethylether, 37.4 weight % dimethylaminoethoxyethanol and 5.4 weight % of other amines were obtained. Since no pure N,N,N'-trimethylbisaminoethylether can be obtained by the reaction the crude reaction mixture was subsequently derivatised with acrylonitrile which leads to a crude reaction mixture comprising approximately 1% of unreacted N,N,N'-trimethylbisaminoethylether. Even derivatisation of N,N,N'-trimethylbisaminoethylether with acrylonitrile was not successful in yielding a complete separation of the product mixture.

U.S. Pat. No. 7,009,081 B2 discloses a method for converting an amino ether alcohol to an amino ether amine comprising contacting a catalyst containing at least zinc oxide and at least copper oxide or a copper salt with a vapor phase mixture comprising the amino ether alcohol and an amine. In particular, the reaction of dimethylaminoethoxyethanol with monomethylamine or dimethylamine produces N,N,N'-trimethylbisaminoethylether and N,N,N',N'-tetramethylbisaminoethylether, respectively. Depending on the catalyst system used the ratio of N,N,N'-trimethylbisaminoethylether to N,N,N',N'-tetramethylbisaminoethylether varies. However, it is not possible to produce pure N,N,N'-trimethylbisaminoethylether.

SUMMARY OF THE INVENTION

The present invention provides a method for separating N,N,N'-trimethylbisaminoethylether from mixtures comprising tertiary amines or tertiary aminoalkylethers in particular N,N,N',N'-tetramethylbisaminoethylether which overcome the problems associated with the methods disclosed in the prior art. Additionally, the present invention solves the problem to provide N,N,N'-trimethylbisaminoethylether in high purity and provides an improved and economic recovering process for N,N,N'-trimethylbisaminoethylether from its amide.

The first embodiment of the present invention is a method for recovering N,N,N'-trimethylbisaminoethylether (A) from its amide (B) which comprises the following steps:
(a) Transamidation of amide (B) with a transamidation agent selected form the group consisting of ammonia, primary and/or secondary amines with the proviso that the transamidation agent is not N,N,N'-trimethylbisaminoethylether;
(b) Separation of N,N,N'-trimethylbisaminoethylether (A) from the reaction mixture obtained in step (a) by fractionated azeotropic and/or fractionated non-azeotropic distillation.

A further embodiment of the present invention is a method for separating N,N,N'-trimethylbisaminoethylether (A) from mixtures comprising at least one tertiary amine or tertiary aminoalkylether different from (A) which comprises the following steps:
(α) amidation of N,N,N'-trimethylbisaminoethylether (A) to obtain amide (B),
(β) separation of the resulting amide (B),
(γ) recovering N,N,N'-trimethylbisaminoethylether (A) from its amide (B) comprising the following steps:
   (a) Transamidation of amide (B) with a transamidation agent selected form the group consisting of ammonia, primary and/or secondary amines with the proviso that the transamidation agent is not N,N,N'-trimethylbisaminoethylether;
   (b) Separation of N,N,N'-trimethylbisaminoethylether (A) from the reaction mixture obtained in step (a) by fractionated azeotropic and/or fractionated non-azeotropic distillation.

A further embodiment of the present invention is a composition comprising a mixture of N,N,N'-trimethylbisaminoethylether and a transamidation agent selected form the group consisting of ammonia, primary and/or secondary amines with the proviso that the transamidation agent is not N,N,N'-trimethylbisaminoethylether, monomethylamine or dimethylamine.

A preferred embodiment is an azeotropic composition comprising N,N,N'-trimethylbisaminoethylether and monoethanolamine.

DETAILED DESCRIPTION OF THE INVENTION

In the following: N,N,N'-trimethylbisaminoethylether is abbreviated with T3MBAEE. Throughout the text the notation of T3MBAEE and N,N,N'-trimethylbisaminoethylether is used interchangeably.

The first step in the method for separating N,N,N'-trimethylbisaminoethylether (A) from mixtures comprising at least one tertiary amine or tertiary aminoalkylether different from (A) according to claim 13 is the amidation of N,N,N'-trimethylbisaminoethylether (A) to obtain amide (B). Tertiary amines according to the present invention are compounds which comprise one or more nitrogen atom(s) which are not directly linked to hydrogen. Likewise tertiary aminoalkylethers according to the present invention are organic chemical compounds which comprise at least one ether group and which comprise one or more nitrogen atom(s) which are not directly linked to a hydrogen atom. A representative example of a tertiary aminoalkylether is N,N,N',N'-tetramethylbisaminoethylether (bis-(2-dimethylaminoethyl)ether). In principle the amidation of N,N,N'-trimethylbisaminoethylether (A) (IUPAC-nane: N,N-dimethyl-2-[2'-(methylamine)ethoxy]ethanamine), can be carried out by any technique known to the person skilled in the art. Preferably, amidation of N,N,N'-trimethylbisaminoethylether (A) is carried out with a carboxylic acid and/or carboxylic acid derivative selected from the group consisting of acylhalide, anhydride, carboxylic esters and carboxylic amides. Examples of suitable carboxylic acid derivatives are acetylhalides such as acetylchloride and acetylbromide, formic acid anhydride, acetic acid anhydride, formic acid ester, acetic acid esters, formamide and acetamide. According to a preferred embodiment of the present invention the amidation step is carried out with a low molecular weight carboxylic acid, preferably a $C_{1-6}$-carboxylic acid, more preferably acetic acid or formic acid. Particularly, the formation of the corresponding formamide of N,N,N'-trimethylbisaminoethylether is preferred.

The separation of N,N,N'-trimethylbisaminoethylether (A) from mixtures comprising at least one tertiary amine or tertiary aminoalkylether such as N,N,N',N'-tetramethylbisaminoethylether by amidation with formic acid has proven to be a very reliable procedure. In particular, the formamide of T3MBAEE is a very heat stable product and does not contribute to any further formation of other heavy compounds or undesired byproduct.

According to a preferred embodiment of the present invention the formamide of T3MBAEE is formed by reaction scheme (1):

Scheme (1):

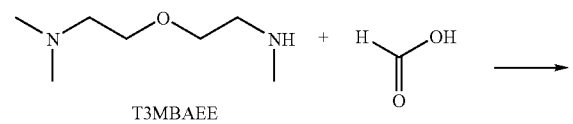

T3MBAEE

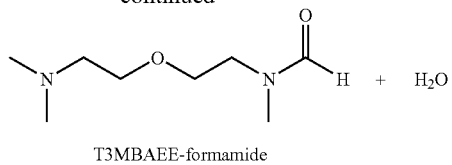

T3MBAEE-formamide

Tertiary amines or tertiary aminoalkylethers such as N,N,N',N'-tetramethylbisaminoethylether are not able to react in the amidation step (α). The amidation reaction with carboxylic acids leads to the formation of the desired amide (B) as well as water. In a preferred embodiment of the present invention the amidation step (α) is carried out at a temperature at which water can be removed continuously from the reaction mixture.

The technique to remove water which is obtained during a reaction is known by the person skilled in the art.

The water removal process in amidation step (α) is preferably an azeotropic distillation by using suitable hydrocarbon solvents. Hydrocarbons which can be used are saturated or unsaturated and/or aromatic hydrocarbons. In general $C_{6-12}$ aromatic, aliphatic or olefin hydrocarbons are preferred. Particularly, hydrocarbon solvents selected from the group consisting of n-hexane and/or its structural isomers, n-hexenes and/or linear and/or structural isomers thereof, n-heptane and/or its structural isomers, n-heptenes and/or linear and/or structural isomers thereof, n-octanes and/or its structural isomers, n-octenes and/or linear and/or structural isomers thereof, cyclohexane, cyclohexene, benzene, methylcyclohexane, methylcyclohexenes and/or its structural isomers, toluene, dimethylcyclohexanes and/or isomer blends thereof, dimethylcyclohexenes and/or isomer blends thereof, xylene and/or isomer blends thereof, ethylbenzene, nonenes and/or nonane hydrocarbons, most preferred are hydrocarbons selected from the group consisting of methylcyclohexane, toluene, xylene and a blend of xylene isomers are preferred.

Depending on the carboxlic acid or the carboxylic acid derivative the amidation step (α) is preferably carried out at a temperature from 50 and 250° C. at atmospheric pressure (100 kPa).

After the amidation of N,N,N'-trimethylbisaminoethylether (A) has been performed the tertiary amines or tertiary aminoalkylethers which have not been amidated can be separated from the amide (B) obtained in amidation step (α). Separation of amide (B) from the mixture comprising at least one tertiary amine and/or tertiary aminoalkylether can in principle be carried out by any known separation technique. According to a preferred embodiment separation step (β) is carried out by distillation, preferably at a temperature from 50 to 250° C. at 1 mbar to 1 bar, preferably at 5 mbar to 1 bar.

The formamide of T3MBAEE which can be obtained by amidation of T3MBAEE with formic acid can preferably be separated from N,N,N',N'-tetramethylbisaminoethylether by distillation of N,N,N',N'-tetramethylbisaminoethylether wherein—due to the higher boiling point—the formamide remains in the distillation residue. Subsequently, the remaining formamide can also be distilled in order to obtain the pure T3MBAEE formamide.

Due to the high chemical stability of the T3MBAEE amide, in particular the T3MBAEE formamide, it is difficult to recover the T3MBAEE itself in an economic way in high yield. However, the present invention overcomes the problem associated with the recovery of N,N,N'-trimethylbisaminoethylether (A) from its amide.

A further embodiment of the present invention is a method for recovering N,N,N'-trimethylbisaminoethylether (A) from its amide (B) which comprises the following steps:
(a) Transamidation of amide (B) with a transamidation agent selected form the group consisting of ammonia, primary and/or secondary amines with the proviso that the transamidation agent is not N,N,N'-trimethylbisaminoethylether;
(b) Separation of N,N,N'-trimethylbisaminoethylether (A) from the reaction mixture obtained in step (a) by fractionated azeotropic and/or fractionated non-azeotropic distillation.

Transamidation of amide (B) with a transamidation agent is exemplarily described by reaction scheme (2) with the formamide of T3MBAEE:

Scheme (2):

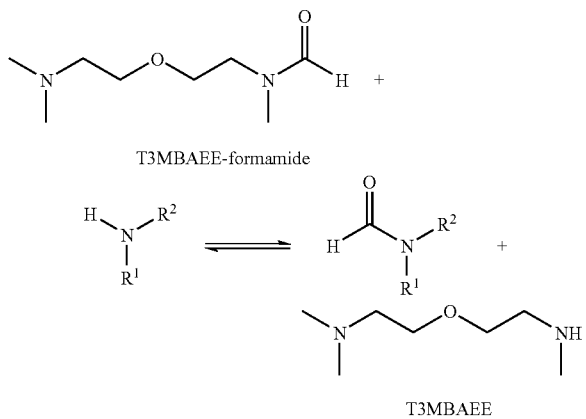

$R^1$ = H, substituted or unsubstituted alkyl, hydroxyalkyl, aryl, heteroaryl
$R^2$ = H, substituted or unsubstituted alkyl, hydroxyalkyl, aryl, heteroaryl In principle, all primary and/or secondary amines can be used. However, one of the problems is the equilibrium between starting amide (B) and the starting amine (transamidation agent) and the product-amide and the desired T3MBAEE.

It has been surprisingly found that the problems can be overcome by separation of N,N,N'-trimethylbisaminoethylether (A) from the reaction mixture obtained in step (a) by fractionated azeotropic and/or fractionated non-azeotropic distillation.

The transamidation agent is selected from the group consisting of ammonia, primary and/or secondary amines.

Preferred transamidation agents are presented by formula (I):

(I)

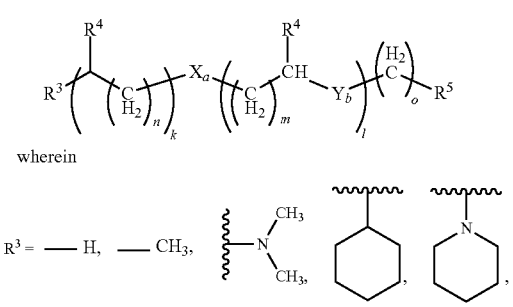

wherein $R^3$ = —H, —CH$_3$,

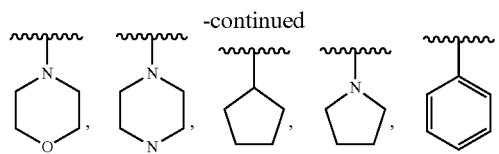

$R^4$ = —H, —CH$_3$, ethyl, propyl, iso-propyl, linear or branched C$_{4-12}$-alkyl;
$R^5$ = $R^3$, —OH, —NH$_2$, —OCH$_3$, —N(CH$_3$)$_2$
X = Y = —O—, —NH—, —N(CH$_3$)—
k = integer from 0 to 35, preferably 1 to 20, more preferably 2 to 10
l = integer from 0 to 5
m = 0 or 1
n = integer from 0 to 30, preferably 1 to 24, more preferably 10 to 18
o = 0 or 1
a = 0 or 1
b = 0 or 1
with the proviso that the transamidation agent comprises at least one nitrogen-hydrogen bond (N—H) and with the proviso that the transamidation agent is not N,N,N'-trimethylbisaminoethylether.

Transamidation agents according to formula (I) are preferred with k=1 and n=an integer from 10 to 30. In case n=0 or 1, k in formula (I) is preferably an integer from 1 to 35, more preferably k is an integer from 2 to 20.

Particularly, preferred transamidation agents are polyalkoxyleneamines or fatty amines.

Preferred transamidation agents are primary or secondary alkanolamines. Primary alkanolamines are preferably selected from the group consisting of monoethanolamine, propanolamine, isopropanolamine as well as C$_{4-8}$-alkanolamines. Secondary alkanolamines are preferably selected from the group consisting of diethanolamine, N-methylethanolamine, N-ethylethanolamine, N-propylethanolamine, N-isopropylethanolamine, N-methylisopropanolamine, N-ethylisopropanolamine, N-isopropylisopropanolamine, N—C$_1$-C$_6$-alkyl-N—C$_2$-C$_6$-alkanolamine, N,N-di-C$_2$-C$_6$-alkanolamine.

Particularly, preferred are alkanolamines selected from the group consisting of monoethanolamine, 2(2-aminoethoxy)-ethanol, N-methylethanolamine, monoisopropanolamine, amino-propane-3-ol, N-ethylethanolamine, N-propylethanolamine, aminobutane-4-ol, N-2-hydroxyethylaniline, N-hydroxyethylpiperazine.

In a further preferred embodiment of the present invention the transamidation agent is selected from the group consisting of substituted and unsubstituted primary and/or secondary alkylamines or arylamines.

The primary alkylamines are preferably selected from the group consisting of methylamine, ethylamine, propylamine, isopropylamine, cyclohexylamine, cyclopentylamine, C$_4$-C$_{18}$ alkylamine, C$_4$-C$_6$ cycloalkylamine The secondary alkylamines are preferably selected from the group consisting of dimethylamine, diethylamine, methylethylamine, C$_1$-C$_6$-alkyl-C$_1$-C$_6$-alkylamine, cycloaliphatic compounds comprising at least one nitrogen atom in the cycle such as pyrrolidone, piperazine, imidazoline and morpholine.

Particularly, preferred are transamidation agents selected from the group consisting of monomethylamine, isopropylamine, aminobutane, aminooctane, aminododecane, aminooctadecane, cyclohexylamine, N-methylcyclohexylamine, N-ethylcyclohexylamine, N,N-dicyclohexylamine, cyclopentylamine, N-methylcyclopentylamine, ethylcyclopentylamine, piperidine, pyrrolidine, aniline, 1,2-diaminoethane, diethylenetriamine, triethylenetetramine, bis-[3-(dimethylamino-propyl]-amine, N-amino ethylpiperazine, 1,3-dimethylaminopropaneamine, 1-methoxypropane-3-amine, butoxypropane-3-amine, (2-dimethylaminoethoxy)-3-propanamine, morpholine, N-aminopropylmorpholine and aminoethoxyethylmorpholine.

Further, ammonia, preferably aqueous ammonia is a suitable transamidation agent.

The transamidation agent is preferably present in excess relative to amide (B). The excess of the transamidation agent is preferred since the transamidation agent is distilled out together with the formed N,N,N'-trimethylbisaminoethylether, preferably as an azeotrope. In a preferred embodiment the transamidation step (a) is carried out essentially with the amide (B) and the transamidation agent without any further organic solvents present.

According to a preferred embodiment of the present invention the transamidation step (a) is carried out wherein the molar ratio of N,N,N'-trimethylbisaminoethylether amide (B) to the transamidation agent is in a range of 1:1.5 to 1:10, preferably 1:2 to 1:6, more preferably 1:3 to 1:4.

Preferably, the transamidation agent in step (a) is a primary alkanolamine wherein preferably the primary alkanolamine is forming an azeotrope with (A). According to a preferred embodiment of the present invention the azeotrope is continuously distilled out during the transamidation process. The primary alkanolamine is preferably monoethanolamine.

According to a further preferred embodiment transamidation step (a) is carried out with a transamidation agent which is a dialkylamine, preferably dimethylamine. Further preferred secondary amines which can be used as a transamidation agent are dialkanolamines, preferably diethanolamine. In particular, in case the transamidation agent is selected from secondary amines such as dialkylamines or dialkanolamines it has been observed that separation step (b) can preferably be carried out by fractionated non-azeoptropic distillation.

According to a preferred embodiment transamidation step (a) is carried out with monoethanolamine. Monoethanolamine forms an azeotrope together with N,N,N'-timethylbisaminoethylether (A). Preferably, the formamide of N,N, N'-trimethylbisaminoethylether (A) is transamidated with monoethanolamine and the N,N,N'-trimethylbisaminoethylether (A) obtained is separated by azeotropic distillation. Reaction scheme (3) reflects a preferred transamidation step (a) of the present invention:

Scheme (3):

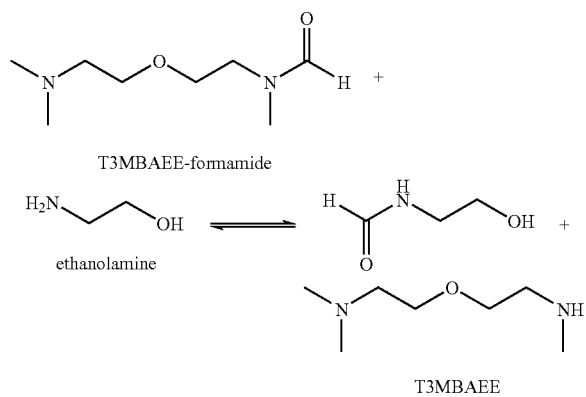

Monoethanolamine is a preferred transamidation agent because it forms an azeotrop with T3MBAEE. When using an excess of monoethanolamine the reaction is driven to completion.

Preferably, the molar ratio of the formamide of T3MBAEE to monoethanolamine is 1:2.5 to 1:4.5, more preferably 1:3 to 1:4, most preferably 1:3.2 to 1:3.6.

All formed T3MBAEE can be removed from the reaction by the azeotrope with monoethanolamine (MEA).

A further advantage of the transamidation step combined with the fractionated azeotropic distillation of the MEA with the T3MBAEE formed is the fact that the transamidation reaction can be driven to completion.

According to a preferred embodiment of the present invention transamidation step (a) is carried out at a temperature from 50 and 250° C. and a pressure from 1 mbar to 100 bar.

Separation step (b) is preferably carried out at a temperature from 50 and 250° C. and a pressure from 1 mbar and 100 bar. The most preferred embodiment of the present invention is a method for separating N,N,N'-trimethylbisaminoethylether (A) from at least N,N,N',N'-tetramethylbisaminoethylether comprising the following steps:

(α) amidation of N,N,N'-trimethylbisaminoethylether (A) with formic acid,
(β) separation of the resulting formamide (B), preferably by distillation;
(a') transamidation of formamide (B) obtained in step (β) with monoethanolamine,
(b') separation of the N,N,N'-trimethylbisaminoethylether (A) from the transamidated product mixture obtained in step (a) by fractionated azeotropic distillation.

The azeotropic composition comprising N,N,N'-trimethylbisaminoethylether (A) and monoethanolamine obtained from the distillation in step (b') is preferably further separated from the monoethanolamine by azeotropic distillation using a suitable hydrocarbon solvent, preferably selected from the group consisting of n-octane and/or its structural isomers, n-octenes and/or linear and/or structural isomers thereof, cyclohexane, cyclohexene, benzene, methylcyclohexane, methylcyclohexenes and/or its structural isomers, toluene, dimethylcyclohexanes and/or isomer blends thereof, dimethylcyclohexenes and/or isomer blends thereof, xylene and/or isomer blends thereof, ethylbenzene, nonanes and nonenes.

A further embodiment of the present invention is a composition comprising a mixture of N,N,N'-trimethylbisaminoethylether and a transamidation agent selected form the group consisting of ammonia, primary and/or secondary amines with the proviso that the transamidation agent is not N,N,N'-trimethylbisaminoethylether, monomethylamine or dimethylamine.

According to a further embodiment the composition comprises a transamidation agent which is defined by the above mentioned formula (I) with the proviso that the transamidation agent is not monomethylamine or dimethylamine.

Preferably, the composition is an azeotropic composition comprising N,N,N'-trimethylbisaminoethylether and monoethanolamine, preferably comprising N,N,N'-trimethylbisaminoethylether to monoethanolamine in a molar ratio of 5:12 to 5.5:11.5, more preferably 6:11.3 at 200 mbar and 124° C.

EXPERIMENTAL

Below are Examples of specific embodiments for carrying out the present invention. The Examples are offered for illustrative purposes only, and are not intended to limit the scope of the present invention in any way. In the examples the Area % by GC is based on the total Area of all peaks observed.

Example 1

Separation of N,N,N',N'-tetramethylbisaminoethyl-ether from T3MBAEE

A distillation product containing 88.31% (Area % by GC) T3MBAEE and 9.22% (Area % by GC) N,N,N',N'-tetramethylbisaminoethylether was reacted with formic acid. The reaction was carried out in a round bottom flask equipped with a distillation column, a phase-separator and a magnetic stirrer. Ceramic packing was used to perform the reaction. A HPLC pump was connected to the 10 liter pot to feed the formic acid.

4900 g of this mixture and 1000 g xylene was charged into the pot. The reaction mixture was heated up to 85° C. and 1620 g of technical formic acid (85 m/m %) was pumped to the pot with 8 g/min feed. The water was continuously removed and the xylene was fed back to remove the water formed in the reaction. When the water formation stopped, the xylene and the contaminants were distilled off until the distillation temperature reached 200° C.

The residue was distilled under 20 mbar vacuum, the reflux:take off ratio was 5:1. The distillation provided 4235 g of T3MBAEE-formamide with 99.8% (Area % by GC) purity. The yield was 82.4%.

Example 2

Transamidation Reaction, Using Monoethanolamine (MEA)

854 g of MEA and 609 g of T3MBAEE-formamide were charged into a 2 liter distillation pot equipped with a distillation column. The column was packed with Sulzer DX packing. This mixture was heated under 200 mbar vacuum. After 3 hours under total reflux the reflux:takeoff ratio was set 10:1 four fractions were collected. MEA forms an azeotrope with T3MBAEE. Table 1 reflects the results obtained.

TABLE 1

Azeotropic distillation

| Fraction nr. | Weight (g) | MEA content Area % (by GC) | T3MBAEE Area % (by GC) | Pressure (mbar) | Temperature of the distillate (° C.) | Reaction temperature (° C.) |
|---|---|---|---|---|---|---|
| 1st | 151 | 32.16 | 67.56 | 200 | 111.5 | 132.5 |
| 2nd | 555 | 38.21 | 60.03 | 200 | 113 | 140.5 to 150 |
| 3rd | 58 | 60.36 | 28.73 | 200 | 116.5 | 167 |

The yield was 88.3%.

Example 3

Transamidation Reaction Using Isopropanolamine

The equipment used in example 2 was filled with 522 g of T3MBAEE-formamide and 747 g of isopropanolamine, the molar ratio was 1:3.3.

After two hours under total reflux, the reflux take off ratio was set to 10:1 and the take off was started. The distillation was performed at 200 mbar vacuum. One fraction was collected (weight: 882 g). The isopropanolamine was co-distilled with T3MBAEE.

| Composition by GC-analysis: | 87.7% (Area %) of isopranolamine 10.89% (Area %) of T3MBAEE |
|---|---|

The yield was 21.92%.

Example 4

Transamidation Reaction, Using Dimethylamine (DMA)

DMA and pure T3MBAEE-formamide were fed into a 100 ml high pressure down-flow reactor filled with Raschig-rings at the following conditions:

| Pressure: | 70 bars (hydrogen pressure) |
|---|---|
| DMA feed: | 48 ml/h |
| T3MBAEE-formamide feed: | 24 ml/h |
| Vent gas: | 20 l/h |

The results are presented in Table 2:

TABLE 2

Non-azeotropic distillation

| Run | Temperature | Conversion of T3MBAEE-formamide |
|---|---|---|
| 1st | 160° C. | 69.13% |
| 2nd | 175° C. | 74.56% |
| 3rd | 190° C. | 77.38% |

Example 5

Transamidation Reaction, Using Diethanolamine (DEA)

The equipment described in example 2 was used. 6.76 mole diethanolamine and 1.69 mole T3MBAEE-formamide were charged. The reaction was performed under 100 mbar vacuum.

The mixture was heated under reflux. Then, the reflux:take off ratio was set to 10:1. During the distillation 3 fractions were collected. The results are presented in Table 3.

TABLE 3

| Fraction | Mass (g) | Area % N,N,N'-trimethylbisaminoethylether |
|---|---|---|
| 1 | 30 | 97.3 |
| 2 | 65.2 | 98.3 |
| 3 | 52 | 95.4 |

Example 6

Transamidation Reaction Using Ammonia

N,N,N'-trimethylbisaminoethylether formamide (1.44 mol, 250 g) and 300 g ammonia-solution (25 weight % in water) were charged in a 1.8-liter, stainless steel autoclave equipped with an impeller and a separate heating-cooling system. After feeding the raw-materials the reactor was purged with argon. The reactor was heated up to 120° C. The mixture was stirred for 8 hours under pressure (9.3 bar). After 8 hours, the reactor was cooled to ambient temperature and the excess ammonia was released, and the remaining ammonia was removed by purging with nitrogen. The obtained product contained 30 Area % by GC N,N,N'-trimethylbisaminoethylether

Example 7

Transamidation Reaction Using Isopropylamine

N,N,N'-trimethylbisaminoethylether formamide (1.44 mol, 250 g) and isopropylamine (255 g, 5.34 mol) were charged in a 1.8-liter, stainless steel autoclave equipped with an impeller and a separate heating-cooling system. After feeding the raw-materials the reactor was purged with argon. The reactor was heated up to 120° C. The mixture was stirred for 8 hours under pressure (8.2 bar). After 8 hours, the reactor was cooled to ambient temperature and the excess ammonia was released, and the remaining ammonia was removed by purging with nitrogen. The obtained product contained 4.6 Area % by GC N,N,N'-trimethylbisaminoethylether

Example 8

Transamidation Reaction Using N-butylamine

N,N,N'-trimethylbisaminoethylether formamide (1.44 mol, 250 g) and n-butylamine (255 g, 4.31 mol) were charged in a 1.8-liter, stainless steel autoclave equipped with an impeller and a separate heating-cooling system. After feeding the raw-materials the reactor was purged with argon. The reactor was heated up to 120° C. The mixture was stirred for 8 hours under pressure (2.6 bar). After 8 hours, the reactor was cooled to ambient temperature and the excess ammonia was released, and the remaining ammonia was removed by purging with nitrogen. The obtained product contained 10.27 Area % by GC N,N,N'-trimethylbisaminoethylether

Example 9

Transamidation Reaction Using N-cyclohexylamine

N,N,N'-trimethylbisaminoethylether formamide (1.44 mol, 250 g) and N-cyclohexylamine (427 g, 4.31 mol) were charged in a 1.8-liter, stainless steel autoclave equipped with an impeller and a separate heating-cooling system. After feeding the raw-materials the reactor was purged with argon. The reactor was heated up to 120° C. The mixture was stirred for 8 hours under pressure (1.4 bar). After 8 hours, the reactor was cooled to ambient temperature and the excess ammonia was released, and the remaining ammonia was removed by purging with nitrogen. The obtained product contained 2 Area % by GC N,N,N'-trimethylbisaminoethylether.

Example 10

Transamidation Reaction Using Aniline

T3MBAEE-formamide (275 g, 1.58 mol) and aniline (515 g, 5.53 mol) were charged in a 2 l round bottom flak equipped with a distillation column filled with 1 m Sulzer Bx packing. The mixture was heated under reflux at 100 mbar. The reflux take off ratio was 10:1. During the distillation 3 fractions were collected and analysed. The results are presented in Table 4.

TABLE 4

| | Fraction | | |
|---|---|---|---|
| | 1 | 2 | 3 |
| Pressure (mbar) | 101 | 99 | 96.6 |
| Mass (g) | 81 | 60 | 40.4 |
| Head temperature (° C.) | 115 | 116.5 | 154 |
| Temperature of reaction mixture (° C.) | 132 | 135 | 203 |
| Aniline (Area %) | 99.85 | 100 | 90 |
| T3MBAEE (Area %) | 0 | 0 | 8.53 |

Example 11

MEA Removal and Purification of T3MBAEE

The same equipment was used as described in example 1.6000 g of raw material and 1862 g of xylene was charged into a 10 liter pot. The raw material contained 51.22% MEA and 47.66% T3MBAEE. The distillation was performed under atmospheric pressure using a reflux ratio:take off ratio of 5:1. The xylene and the MEA forms a hetero-azeotrope. The xylene was continuously fed back to the pot and the MEA remained in the lower phase of the separator. The distillation was stopped when only xylene was collected in the distillate.

The bottom product was charged in another distillation column packed with SULZER DX packing. The distillation was performed at 40 mbar vacuum. The first fraction was mainly xylene, the second fraction was 2468 g and contained 99.6% (Area % by GC) T3MBAEE. The overall yield of the distillation was 86.3%.

The invention claimed is:

1. A method for recovering N,N,N'-trimethylbisaminoethylether (A) from its amide (B) which comprises the following steps:
    (a) transamidation of amide (B) with a transamidation agent selected from the group constisting of ammonia, primary and/or secondary amines with the proviso that the transamidation agent is not N,N,N'-trimethylbisaminoethylether;
    (b) separation of N,N,N'-trimethylbisaminoethylether (A) from the reaction mixture obtained in step (a) by fractionated azeotropic and/or fractionated non-azeotropic distillation.

2. A method according to claim 1, wherein the transamidation agent in step (a) is represented by formula (I):

$$R^3 \left( \begin{array}{c} R^4 \\ | \\ C \\ | \\ H_2 \end{array} \right)_n \Bigg)_k X_a \left( \begin{array}{c} R^4 \\ | \\ C \\ | \\ H_2 \end{array} \right)_m \Bigg)_l \text{CH} - Y_b \left( \begin{array}{c} H_2 \\ | \\ C \end{array} \right)_o R^5 \tag{I}$$

wherein

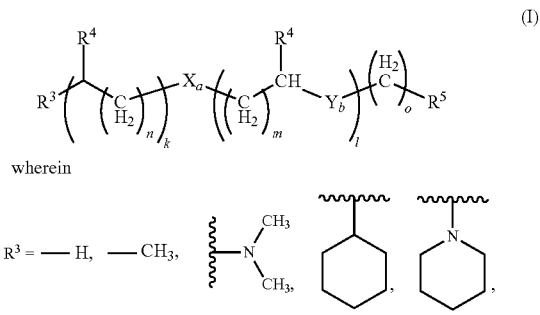

-continued

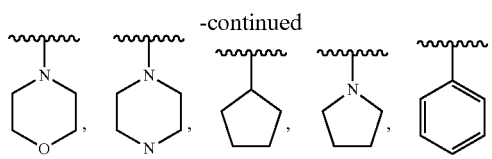

R⁴ =—H, —CH₃, ethyl, propyl, iso-propyl, linear or branched $C_{4-12}$-alkyl;
R⁵ =R³, —OH, —NH₂, —OCH₃, —N(CH₃)₂
X=Y=—O—, —NH—, —N(CH₃)—
k=integer from 0 to 35
l=integer from 0 to 5
m=0 or 1
n=integer from 0 to 30
o=0 or 1
a=0 or 1
b=0 or 1 with the proviso that the transamidation agent comprises at least one nitrogen-hydrogen bond (N—H) and with the proviso that the transamidation agent is not N,N,N'-trimethylbisaminoethylether.

3. A method according to claim 2, wherein the transamidation agent is selected from the group consisting of ammonia, monomethylamine, isopropylamine, aminobutane, aminooctane, aminododecane, aminoctadecane, cyclohexylamine, N-methylcyclohexylamine, N-ethylcyclohexylamine, N,N-dicyclohexylamine, cyclopentyl amine, N-methylcyclopentylamine, ethylcyclopentylamine, piperidine, pyrrolidine, aniline, 1,2-diaminoethane, diethylenetriamine, triethylenetetramine, bis-[3-(dimethylamino-propyl]-amine, N-aminoethylpiperazine, 1,3-dimethylaminopropaneamine, 1-methoxypropane-3-amine, butoxypropane-3-amine, (2-dimethylaminoethoxy)-3-propaneamine, morpholine, N-aminopropylmorpholine and aminoethoxyethylmorpholine.

4. A method according to claim 2, wherein the transamidation agent is a dialkylamine.

5. A. method according to claim 2, wherein the transamidation agent is a dialkanolamine.

6. A method according to claim 2, wherein the separation step (b) is a fractionated non-azeotropic distillation.

7. A method according to claim 1 wherein the transamidation agent in step (a) is a primary alkanolamine.

8. A method according to claim 7, wherein the primary alkanolamine is forming an azeotrope with (A).

9. A method according to claim 8, wherein the azeotrope is continuously distilled out during the transamidation process.

10. A method according to claim 7, wherein the primary alkanolamine is monoethanolamine.

11. A method according to claim 1 wherein the transamidation step (a) is carried out at a temperature from 50-250° C. and a pressure from 1 mbar-100 bar.

12. A method according to claim 1 wherein the separation step (b) is carried out at a temperature from 50-250° C. and a pressure from 1 mbar-100 bar.

13. A method for separating N,N,N'-trimethylbisaminoethylether (A) from mixtures comprising at least one tertiary amine or tertiary aminoalkylether different from (A) which comprises the following steps:
(α) amidation of N,N,N'-trimethylbisaminoethylether (A) to obtain amide (B),
(β) separation of the resulting amide (B),
(γ) recovering the N,N,N'-trimethylbisaminoethylether (A) from its amide (B) by a process defined in claim 1.

14. A method according to claim 13, wherein the amidation step (α) is carried out with a $C_{1-6}$-carboxylic acid.

15. A method according to claim 14, wherein the carboxylic acid is formic acid or acetic acid.

16. A method according to claim 13, wherein the amidation step (α) is carried out at a temperature at which water can be removed continuously from the reaction mixture.

17. A method according to claim 16, wherein the water is removed by azeotropic distillation using hydrocarbon solvents selected from the group consisting of n-hexane, nihexenes, n-heptane, n-heptenes, n-octanes, n-octanes, cyclohexane, cyclohexene, benzene, methylcyclohexenes, dimethylcyclohexanes, dimethylcyclohexenes, ethylbenzene, nonane or nonenes.

18. A method according to claim 16, wherein the water is removed by azeotropic distillation using hydrocarbon solvents selected from the group consisting o f mtheylcyclohexane, toluene, xylene or a blend of xylene isomers.

19. A method according to claim 13, wherein the amidation step (α) is carried out at a temperature from 50 and 250° C. at atmospheric pressure.

20. A method according to claim 13, wherein the separation step (β) is carried out by distillation.

21. A method according to claim 20, wherein the distillation is carried out at a temperature from 50° C. to 250° C. at 1 mbar to 1 bar.

22. A method according to claim 13 comprising the following steps:
(α) amidation of N,N,N'-trimethylbisaminoethylether (A) with formic acid,
(β) separation of the resulting formamide,
(a) transamidation of the formamide obtained in step (β) with monoethanolamine,
(b) separation of the N,N,N'-trimethylbisaminoethylether (A) from the transamidated product mixture obtained in step (a) by fractionated azetropic distillation.

23. A method according to claim 22 further comprising the step:
separation of the monoethanolamine from the azeotropic composition comprising N,N,N'-trimethylbisaminoethylether (A) and monoethanolamine obtained from the distillation in step (b') by azeotropic distillation using hydrocarbon solvents selected from the group consisting of n-octane, n-octenes, cyclohexane, cyclohexene, benzene, methylcyclohexane, methylcyclohexene, toluene, dimethylcyclohexane, dimethylcyclohexene, xylene, ethylbenzene, nonane or nonenes.

24. Composition according to claim 23, wherein the transamidation agent is represented by formula (I):

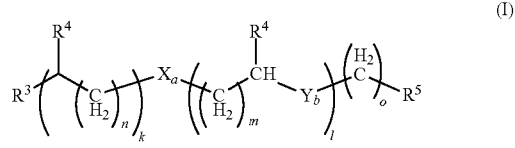

wherein

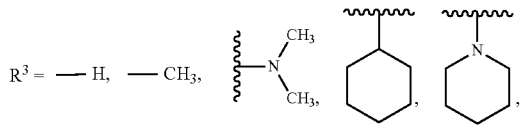

-continued

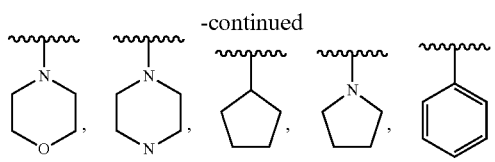

$R^4$=—H, —$CH_3$, ethyl, propyl, iso-propyl, linear or branched $C_{4-12}$-alkyl;
$R^5$=$R^3$, —OH, —$NH_2$, —$OCH_3$, —$N(CH_3)_2$
X=Y=—O—, —NH—, —$N(CH_3)$—
k=integer from 0 to 35
l=integer from 0 to 5
m=0 or 1
n=integer from 0 to 30
o=0 or 1
a=0 or 1
b=0 or 1
with the proviso that the transamidation agent comprises at least one nitrogen-hydrogen bond (N—H) and with the proviso that the transamidation agent is not N,N,N'-trimethylbisaminoethylether, monomethylamine or dimethylamine.

25. Composition comprising a mixture of N,N,N'-trimethylbisaminoethylether and a transamidation agent selected form the group consisting of ammonia, primary and/or secondary amines with the proviso that the transamidation agent is not N,N,N'-trimethylbisaminoethylether, monomethylamine or dimethylamine.

26. The composition according to claim 25 comprising N,N,N'-trimethylbisaminoethylether and monoethanolamine.

* * * * *